United States Patent [19]
Burgholte et al.
[11] 3,731,169
[45] May 1, 1973

[54] DIGITAL SLIP FREQUENCY CONTROL CIRCUIT FOR ASYNCHRONOUS DYNAMO ELECTRIC MACHINES

[75] Inventors: Alwin Burgholte, 208 Pinneberg; Rainer Wirtz, 7141 Unterriexingen; Helmut Domann, 725 Leonberg, all of Germany

[73] Assignee: Robert Bosch GmbH, Gerlingen-Schillerhohe Robert-Bosch-Platz, Germany

[22] Filed: Mar. 24, 1972

[21] Appl. No.: 237,650

[30] Foreign Application Priority Data

Apr. 24, 1971 Germany....................P 21 20 193.4

[52] U.S. Cl. ..................318/227, 318/230, 318/231
[51] Int. Cl. ..............................................H02p 5/40
[58] Field of Search......................318/227, 230, 231

[56] References Cited

UNITED STATES PATENTS

| | | | |
|---|---|---|---|
| 3,675,099 | 7/1972 | Johnston | 318/227 X |
| 3,691,438 | 9/1972 | Fayre | 318/227 X |
| 3,697,843 | 10/1972 | Riess | 318/227 |
| 3,568,022 | 3/1971 | Domann | 318/231 |

*Primary Examiner*—Gene Z. Rubinson
*Attorney*—Flynn & Frishauf

[57] ABSTRACT

A control pulse generator is connected to control the gates of thyristor-type inverter circuits supplying an asynchronous dynamo electric machine with a-c power from a d-c source. The slip frequency is determined by a slip frequency pulse generator supplying pulses at a pulse repetition frequency (PRF) representative of a command value, in a feedback circuit including a tachometer generator supplying pulses at a PRF representative of speed of the machine; pulses are applied to a bi-directional counter, the count in the counter controlling the control pulse generator. To prevent simultaneous input to the forward and reverse terminals of the bi-directional counter, a clock pulse source of predetermined frequency which is higher than the highest PRF expected is connected to a time-scanning and division network interconnecting the outputs of the various pulse sources and the counter so that pulses will be applied to the counter only as controlled by the clock pulse source. To enable the control pulse generator to have a wide range, for example between 50 to 30,000 Hz with controlled on-off ratio, a chopper applies positive and negative pulses to an integrator which is connected to a threshold amplifier, providing an output each time the threshold from the integrator is exceeded in either direction, the output controlling the operating rate of the chopper.

14 Claims, 9 Drawing Figures

DIGITAL SLIP FREQUENCY CONTROL CIRCUIT FOR ASYNCHRONOUS DYNAMO ELECTRIC MACHINES

CROSS REFERENCE TO RELATED PATENTS:

U.S. Pat. Nos. 3,568,022 and 3,593,161.

The present invention relates to a digital control system to control the slip frequency of an asynchronous dynamo electric machine by controlling the gates of a thyristor-type inverter circuit supplying the dynamo electric machine with a-c power from a d-c source. More particularly, the present invention relates to an improvement of the type of circuit generally disclosed in the cross referenced U.S. Pat. No. 3,568,022.

Control circuits which utilize asynchronous machinery supplied from d-c sources through thyristor inverters have been previously proposed. Such systems are employed in the drive of vehicles from a battery source, by exactly controlling the slip frequency, and thus the torque of the dynamo electric machine. This torque may be on drive wheels or, when in a braking mode, torque is being supplied to the machine, and the machine feeds back power to charge the battery, or to be dissipated by dynamic braking. A bidirectional counter has been used to compare a control value with the speed of the asynchronous machine. Such a counter has the advantage of digital circuitry: frequency measurements are more exact than utilization of analog circuits in measuring circuitry, and overall better rejection of noise pulses and other undersired interferences with operation of the circuit are obtained.

The output pulses derived from control pulse generators, from a slip frequency generator, and a tachometer generator may have temporal overlap. Before these pulses can be applied to the count inputs of a bidirectional counter, a circuit is necessary to suppress pulses which coincide, that is, which have a temporal overlap. Previously proposed control circuits of this type require a number of monostable multivibrators. The construction of monostable multivibrators requires condensers which have narrow tolerances while having high values of capacity in order to provide high time constants. This makes the entire circuit rather costly.

It is an object of the present invention to prevent the application of coincident pulses to the inputs of a bidirectional counter while requiring only few circuit components.

Subject matter of the present invention: Briefly, a control circuit, for example of the type referred to in the cross referenced U.S. Pat. No. 3,568,022 is so constructed that a pulse source is provided which has a predetermined pulse repetition frequency (PRF), the pulses from the source being applied to a time scanning or time division circuit so that each pulse from one of the sources will be directed and controlled by the scanned pulses from the pulse generator.

In accordance with a feature of the invention, the entire circuitry can be built of integrated circuits utilizing digital techniques, the time scanning circuit being constructed in the form of three sub-groups utilizing multi-input flip-flops and NAND-gates, controlled by the clock pulse source.

The invention will be described by way of example with reference to the accompanying drawings, wherein.

Figure 2:
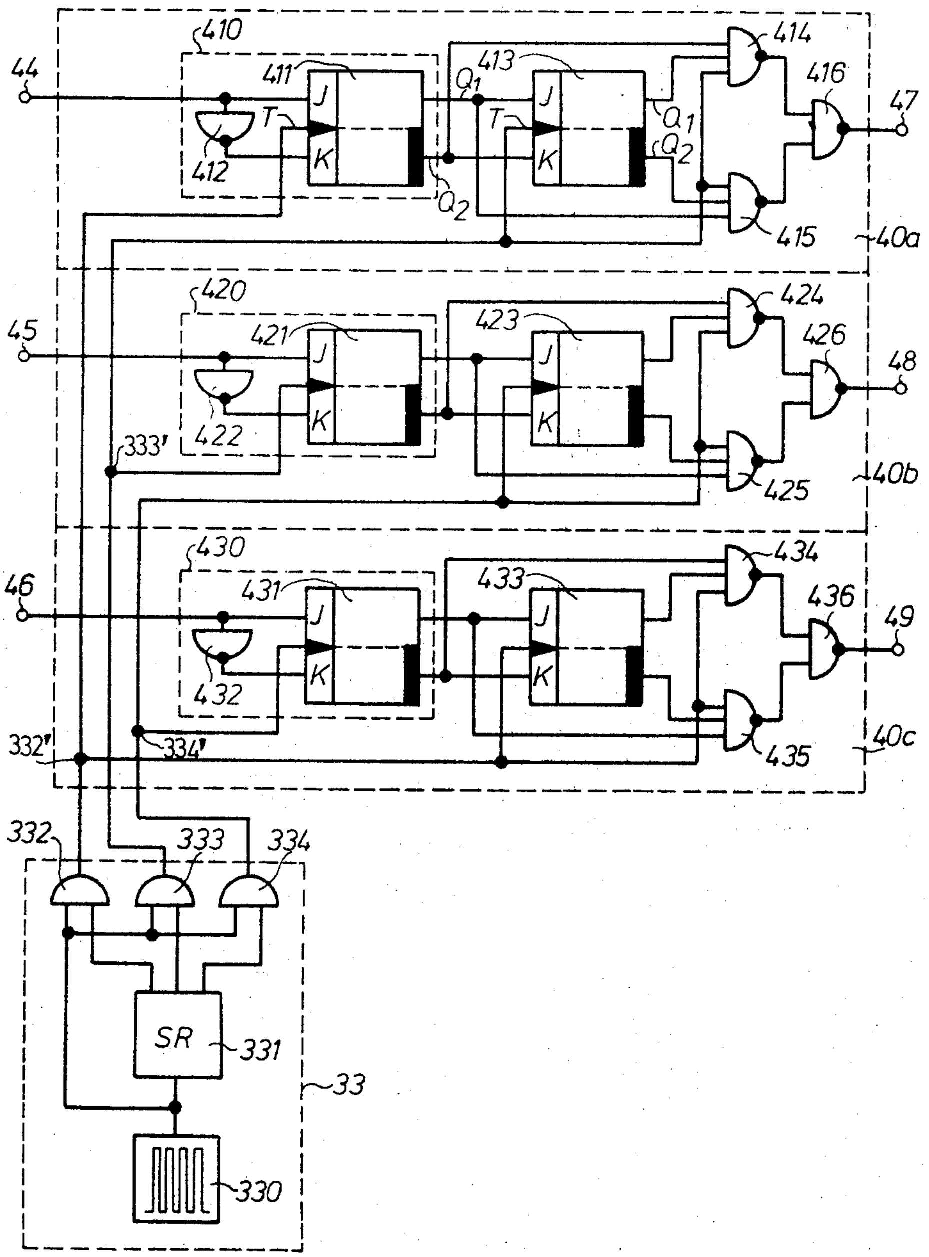
FIG. 2 is a circuit diagram of the time scanning and time division circuit.
Figure 2A:
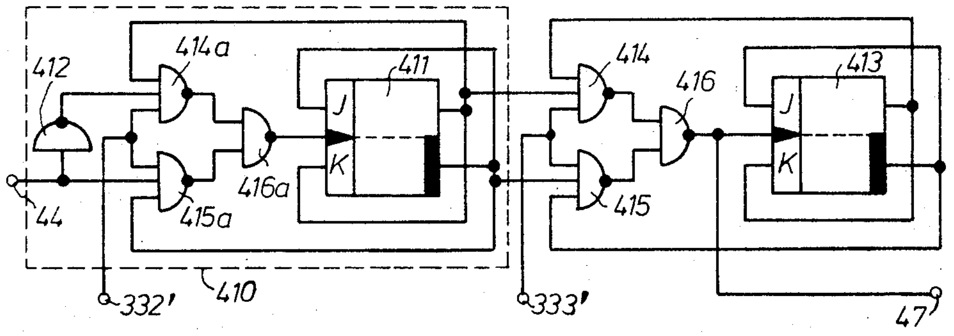
Figure 3:
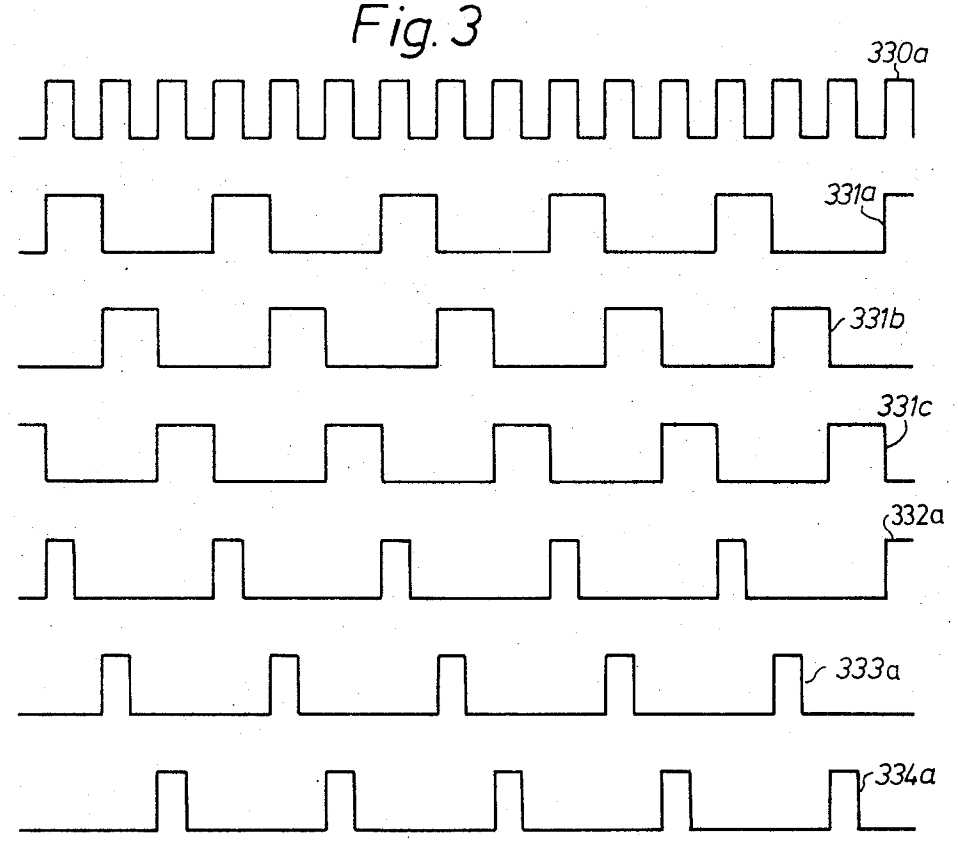
Figure 4:
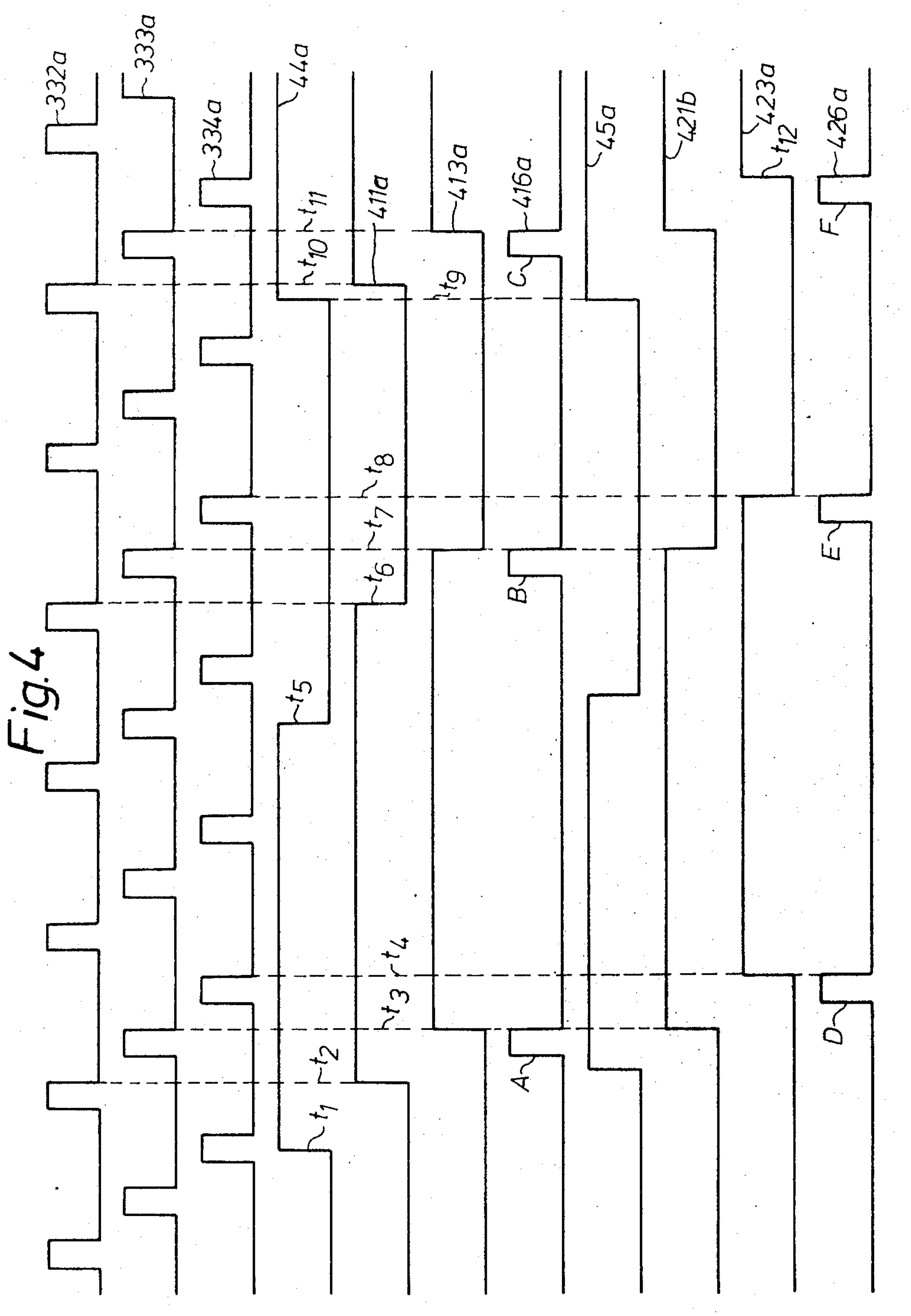
Figure 5:
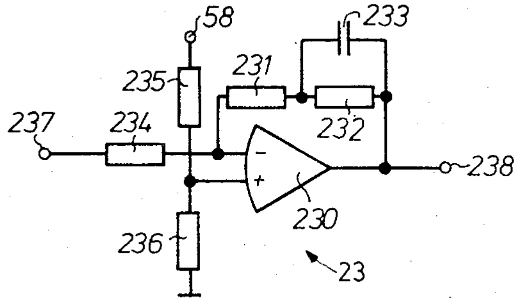
Figure 5A:
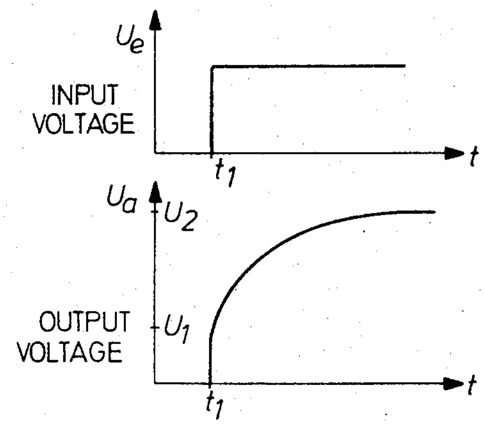
Figure 6:
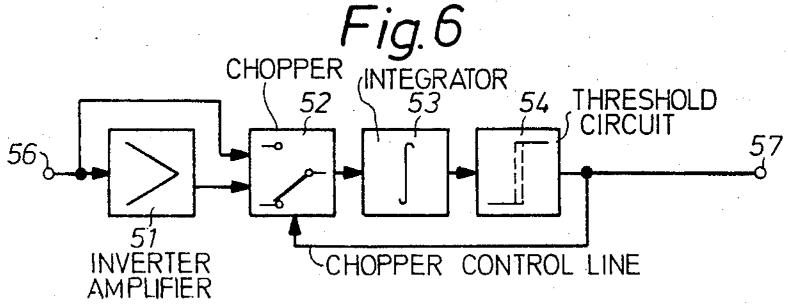
Figure 7:
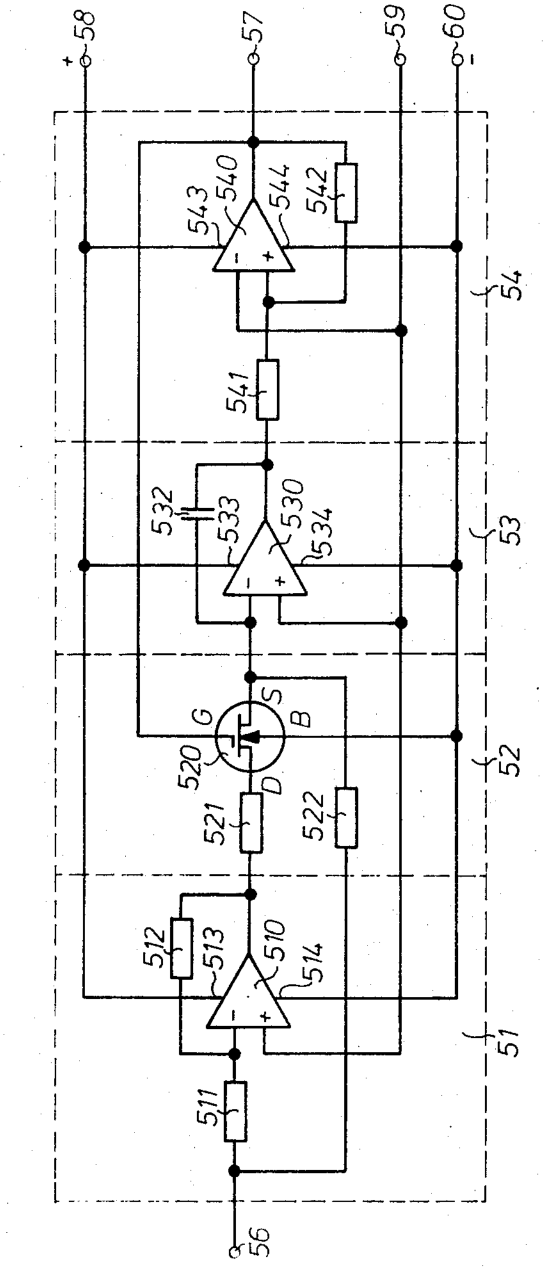

FIG. 2*a* is a fragment of the circuit of FIG. 2, showing a different embodiment;

FIG. 3 is a pulse diagram showing, in mutually aligned superposed graphs, various pulses occurring in the circuit;

FIG. 4 is a further pulse diagram, to illustrate the operation of a time scanning circuit;

FIG. 5 is a circuit diagram of a control amplifier;

FIG. 5*a*, in two superposed aligned graphs, illustrates the operation of the control amplifier of FIG. 5;

FIG. 6 is a schematic circuit diagram in block form of a wide band control pulse source; and FIG. 7 is a circuit diagram of the control pulse source of FIG. 6.

An asynchronous machine 11 is supplied from a d-c energy source 12, such as a battery, over three inverter stages 13, 14, 15, converting d-c to three-phase a-c. The asynchronous dynamo electric machine 11 drives a shaft 16 which is connected to a gear box 17 and then to a wheel 18. The speed of shaft 16 is sensed by a tachometer generator 19 which supplies output pulses in dependence on the speed of shaft 16.

The control gates, or control inputs of the inverter stages 13, 14, 15 are connected to the output of a control generator 20. Generator 20 has one input 21 which is supplied with a fixed, preferably regulated voltage. It also has a frequency control input 22. Frequency control input 22 is connected to a series circuit which, in this order, includes a bi-directional (up-down) counter 25, a digital-analog converter 24, a control amplifier 23, and a pulse generator 50. An OR-gate 26 is connected to the reverse count input *r* and an OR-gate 27 to the forward count input *v* of the bi-directional counter 25.

A time scanning circuit 40 is interconnected to the inputs of the OR-gates 26, 27. The time scanning circuit 40 has three separate groups **40*a*, 40*b*, 40*c*, and is controlled by a pulse generator 33. Each one of the groups has an input 44, 45, 46, respectively, and an output 47, 48, 49, respectively. As seen, input 44 connects to the output of the control pulse generator 50; input 46 is connected to the output of tachometer generator 19. Input 45 is connected to a pulse source 30 which provides pulses at an PRF depending on a command value. The PRF of the pulse source 30, which determines the slip frequency, is controlled by an accelerator controller 32, or a brake controller 31**, depending upon whether the vehicle is to operate under power, or under braking.

The output 47 is connected to one input of the AND-gate 27. The output 48 can be connected selectively with the second input of either of the AND-gates by a transfer switch 28. The transfer switch 28 is connected to be operated when the brake pedal 31 is operated.

The three groups, or elements of the time scanning circuit 40 are best seen in FIG. 2. The pulse generator 33 includes an oscillator 330 which is connected to a shift register 331, having three outputs. The three outputs of the shift register 331 are connected with one input each of three AND-gates 332, 333, 334; the second inputs of the AND-gates 332, 333, 334 are connected to the output of the oscillator 330. The entire arrangement is such that, in effect, the shift register becomes a ring counter providing pulses in staggered sequence from the AND-gates to respective output terminals 332', 333', 334'.

The sub-groups are constructed of different types of flip-flops, the logical functions of which are well known, see for example F. Dokter, J. Steinhauer: Digitale Elektronik in der Messtechnik und Datenverarbeitung, Philips-Fachbuecher 1969, Vol. 1, pp. 162 et seq. and Pressman, "Design of Transistorized Circuits for Digital Computers," Rider, N.Y. The flip-flops, themselves, are similar. For purposes of explanation, the flip-flop 410 will be denoted as a D flip-flop which has a single pulse input 44, a clock pulse input T and a pair of complementary outputs $Q_1$, $Q_2$. Complementary outputs always provide signals of opposite polarity. Thus, when output $Q_1$ has a ONE signal, output $Q_2$ will be at a ZERO signal level. A typical J-K flip-flop, such as flip-flop 413, has a pair of control pulse inputs J-K; a clock pulse input T and a pair of complementary outputs $Q_1$, $Q_2$.

Change of the input signal at the pulse input 44 of the D flip-flop 410 does not, as such, result in any change in the setting of the flip-flop itself (see for example FIG. 4, time $t_1$). First, the clock pulse input T must have a pulse applied thereto. At the end of the clock pulse, the input signal at the pulse input terminal 44 is transferred to the output $Q_1$ (see time $t_2$, $t_6$) and, of course, to the complementary output $Q_2$. The two J K inputs of the J K flip-flop 413 operate similarly, except that they have complementary signals applied thereto. Again, upon change of the signals to the J, K input nothing changes until, at the end of the next subsequent clock pulse, the outputs $Q_1$, $Q_2$ will have ONE and ZERO level outputs applied thereto. The basic difference between the D flip-flop and the J K flip-flop is the nature of the input; as an actual construction item, the D flip-flop may be similar to the J K flip-flop, with an inverter 412 added, connected as seen in FIG. 2 between the input pulse terminal 44 and the K input of a J K type flip-flop unit.

The two inputs J, K of the J K flip-flop 413 have complementary signals applied thereto — see FIGS. 2 and 2*a;* upon a change of signal at the input terminals, nothing happens until the clock terminal T has a signal applied thereto. At the termination of the clock pulse, the two outputs $Q_1$, $Q_2$ will have respective ONE and ZERO outputs appearing thereat.

The first sub-group 40a of the time scanning or time division network has the D flip-flop 410 and the J K flip-flop 413. The D flip-flop 410, itself, is built of a J K flip-flop 411, and an inverter 412. A first NAND-gate 414 is connected to the second output $Q_2$ of the D flip-flop 410, and to the first output $Q_1$ of the JK flip-flop 413, and further with the clock pulse input T of the JK flip-flop (FF) 413. Similarly, a second NAND-gate 413 is connected to the first output $Q_1$ of the D-FF 410, to the second output $Q_2$ of the JK-FF 413 and to the clock pulse input T of the JK-FF 413. The outputs of the two NAND-gates 414, 415, are connected to the inputs of a third NAND-gate 416, the output of which forms the output 47 of the first sub-group 40*a*.

The time input T of the D-FF 410 is connected to the first AND-gate 332. The clock pulse input T of the JK-FF 413 is connected at a second AND-gate 333. The connections of the clock pulse inputs to the second and third sub-groups 40*b*, 40*c* are similar, but cyclically exchanged, with respect to the first sub-group 40*a*, as clearly seen in FIG. 2.

FIG. 2*a* is a different embodiment of the circuit of one of the sub-groups, the particular circuit being similar to that of sub-group 40*a*. The output of the third NAND-gate 413 is connected to the clock pulse input T of the JK-FF 413. The second AND-gate 333 is connected to the third inputs of the two NAND-gates 414, 415 rather than to the clock pulse input T of the JK-FF 413. The D-FF 410 is somewhat more complicated than in the example of FIG. 2; in advance of the second JK-FF 411, three NAND-gates 414*a*, 415*a*, 416*a* are connected, just as in the first JK-FF 413. The operation is identical to the example in accordance with FIG. 2, and the circuit is a functional equivalent thereof.

The timing diagrams of FIGS. 3 and 4 have reference numerals and a letter added thereto additionally; the reference numerals are the same as the circuit elements of the sub-groups, previously discussed, which deliver the pulses shown in the Figures.

The control amplifier of FIG. 5, which is a circuit diagram of amplifier 23 (FIG. 1) includes an operational amplifier 230 as an active component, having a non-inverting input which is connected to the tap point of a voltage divider formed of two resistances 235, 236. The inverting input is connected to an input resistance 234 and then to input terminal 237. The feedback circuit includes a pair of resistances 231, 232 with a condenser 233 connected across one of the resistances.

FIG. 5a shows the relationship of input and output voltages; if input voltage $U_e$, at time $t_1$ (upper graph) rises abruptly, the output voltage $U_a$ will have a time varying increase as shown in the lower graph.

The pulse generator 50 (FIG. 1) is illustrated in detail in FIGS. 6 and 7. It is built up of a series circuit of an inverter stage 51, a chopper 52, an integrator 53 and a threshold switch 54. The input terminal 56 is connected to the inverter stage 51 and, additionally, to one switching input of the chopper 52. The output of the inverter 52 is connected to the other switching input of chopper 52. The control input of the chopper, controlling the interruption rate is connected to the output of the threshold switch 54. FIG. 7 illustrates the circuit in detail. The inverter stage 51 includes an operational amplifier 510, as its active element, connected over a pair of supply lines 513, 514 to a positive supply bus 58 and a negative supply bus 60. The output of the operational amplifier 510 is connected over resistance 512 over the feedback circuit to the inverting input. The inverting input is connected over an input resistance 511 with the input terminal 56. The non-inverting input of the operational amplifier 510 is connected with a ZERO bus 59. In the present example, the ZERO bus 59 is placed at zero volts, the plus line 58 at +5 V and the minus bus 60 on −5 V.

The chopper 52 includes a field effect transistor (FET) 520, having a drain electrode D connected over resistance 521 with the output of operational amplifier 510. The source electrode S of the FET 520 is connected over resistance 522 with the input terminal 56. The two switching inputs of the chopper 52 are formed by the resistances 521 and 522, respectively, and the gate electrode G forms the control input. The source electrode S is the output of the chopper 52. A bulk electrode B of the FET 520 is connected to negative bus 60.

Integrator 53 includes an operational amplifier 530 having a feedback circuit to which an integrating condenser 532 is connected. The inverting input of the operational amplifier 530 is connected to the output of chopper 52; the non-inverting input is connected to zero voltage line 59. The operational amplifier 530 is connected to positive and negative buses 58, 60, as shown.

The threshold switch 54 includes an operational amplifier 540 which has a positive feedback circuit in which a resistance 542 is placed, so that it, effectively, operates like a Schmitt-trigger. A pair of supply lines 543, 544 connect the operational amplifier 540 to positive and negative buses 58, 60. The inverting input of the operational amplifier 540 is connected to zero line 59; the non-inverting input is connected over input resistance 541 with the output of integrator 53. The output of the operational amplifier 540 is connected to output terminal 57.

The function of the control generator 20 and the inverter stages 13, 14, 15 is well known (see, for example, Heumann-Stumpe: "Thyristoren," 1969, pp. 247–259). The control generator 20 must control both the frequency as well as the voltage of the alternating current supplied by the inverter stages. The present invention only relates to the control of the frequency. Therefore, the control circuits which are to be connected to control the input voltage at terminal 21 are not shown in FIG. 1. Controlled voltage supplies are well known in the art.

Operation: Let the speed of the drive shaft 16 be denoted $f_n$, the output frequency of the slip frequency pulse source 30 with $c \cdot f_2$, and the output frequency of the control pulse generator 50 with $c \cdot f_1$. The factor $c$ is equal to the number of pulses which the pulse source 19 supplies upon one revolution of shaft 16. This factor may, for example, be 50. Control generator 20 includes a frequency divider which divides the frequency $c \cdot f_1$ to the inverter frequency to supply the dynamo electric machine 11.

The entire control circuit is designed to provide a control frequency $f_1$ of such order that it is equal to the sum of the speed $f_n$ and the slip frequency $f_2$, that is, the following equation is satisfied:

$$f_1 = f_n + f_2 \quad (1)$$

This equation is satisfied when the impulse trains of frequency $c \cdot f_n$ and $c \cdot f_2$ are applied to the forward count input of the bi-directional counter 25, and the impulse train of frequency $c \cdot f_1$ is connected to the backward or reverse count input of the bi-directional counter 25, that is, to terminal $r$.

When this relationship is satisfied, the pulses applied to the forward count input $v$ and the pulses applied to the backward count input $r$ will have an equal number of pulses for each unit of time applied, so that the bi-directional counter 25 retains its count number. D/A converter 24 supplies a constant direct current upon constant count number, which direct current is applied over control amplifier 23 to the input of the pulse generator 50, so that its output pulse frequency $f_1$ will remain constant. If the above equation (1) is not satisfied, then the count condition of the bi-directional counter 25 will shift in positive or negative direction, and the output frequency $f_1$ of the control pulse generator 50 will shift in positive or negative direction until the equation is again satisfied.

Figure 1:
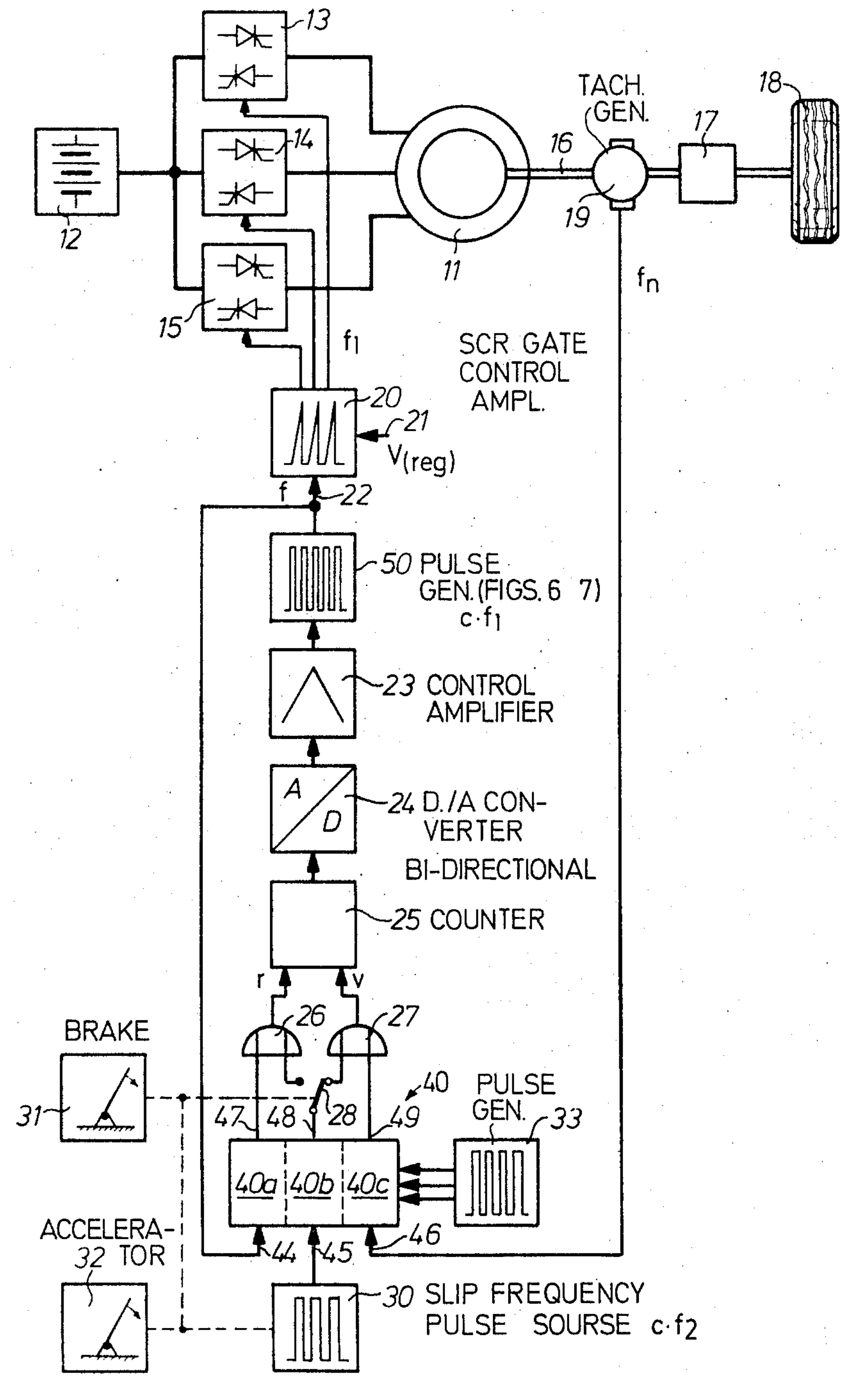
FIG. 1 is a general block diagram of the system of the present invention.

Let it be assumed first that the asynchronous machine is to be started from rest, in order to clearly explain the operation and control of the counter. Upon operation of the accelerator pedal 32, slip frequency pulse source 30 provides output pulses at a frequency $c \cdot f_2$. This frequency is proportional to the deflection of the accelerator pedal 32. Time division circuit 40*b*, and switch 28 (in the position shown in FIG. 1) apply pulses to the AND-gate 27 and, upon coincidence with pulses from terminal 49, the pulses are then applied to the forward count input $v$ of the bi-directional counter 25. Counter 25 starts to count forwardly starting from zero. The D/A converter 24 provides a d-c output voltage at its output terminal, the amplitude of which is proportional to the count number in the counter. The output voltage from converter 24 is applied to input terminal 237 (FIG. 5) of the control amplifier 23 (FIG. 1). The output from control amplifier terminal 238 (FIG. 5) is applied to the input terminal 56 (FIGS. 6, 7) of the pulse generator 50 (FIG. 1). The output frequency of the pulse generator 50 thus is dependent on the count number in the bi-directional counter 25, as further described below. The output pulses from terminal 57 (FIGS. 6, 7) of the pulse generator 50 (FIG. 1) 1) are applied first over the sub-group 40a to the OR-gate 26 which, in turn, is connected to the reverse count input of the counter 25. Additionally, the pulses are applied to the frequency control input 22 of the gate control amplifier 20.

Asynchronous dynamo electric machine 11 starts since the thyristor inverter 13, 14, 15 is now gated. Tachometer generator 19 will start to deliver pulses which are applied over the third scanning or time division network group 40*c* to the AND-gate 27, to be applied to the forward count input $v$ of the bi-directional counter 25. This counter already counted forwardly, since it had the pulses of the slip frequency pulse source 30 already applied thereto (the tachometer generator 19, when stopped, providing an enabling signal). As the asynchronous machine 11 starts, the pulses from the tachometer generator 19 are additionally applied. This causes the counter to continue to count, although more slowly, until the slip frequency of the asynchronous machine 11 is exactly equal to the slip frequency set by pulse source 30. As soon as the slip frequency $f_2$ or, rather, $c \cdot f_2$, as controlled by the pulse source 30 is equal to the slip in the asynchronous machine itself, the bi-directional counter 25 will stop counting further and the frequency $f_1$ of the output pulses of the control pulse source 30 will remain constant.

If the speed of the asynchronous machine 11 is to be reduced, accelerator pedal 32 can be lifted, so that the output frequency $c \cdot f_2$ of the pulse source 30 will decrease. At the next instant, the sum of $c \cdot f_n$ and $c \cdot f_2$ will be less than $c \cdot f_1$. The count condition of the bi-directional counter 25 will thus decrease, and the output frequency $f_1$ of the control pulse generator 50 will likewise decrease. The decrease of $f_1$ continues until the asynchronous machine will have the slip which corresponds to that controlled by accelerator pedal 32.

Transfer switch 38 permits the possibility to operate the asynchronous machine 11 as a generator and thus to supply back energy to the energy source 12 under conditions of dynamic braking. When the dynamo electric machine operates as a generator, the slip frequency has, mathematically, negative values. The negative value of the slip frequency is considered by applying the output pulses of a slip frequency pulse source 30 not to the forward count input *v*, but rather, to the reverse count input *r* of the bi-directional counter 25. Transfer is obtained by interconnecting the brake pedal 31 with the transfer switch 28, as indicated schematically by the dashed lines in FIG. 1. In the braking mode, the output frequency $c \cdot f_2$ of the slip frequency pulse source 30 is controlled by the setting of the brake pedal 31; the harder the brake pedal 31 is operated, the greater the slip frequency and thus the braking torque.

It is important that the two count inputs *r*, *v* of the bi-directional counter 25 never have pulses applied thereto which coincide in time, since otherwise the counter will not operate satisfactorily. The time scanning or time division network 40 is provided to eliminate the possibility of coincidence of different pulses of different pulse trains; its operation will be explained in connection with FIGS. 2, 3 and 4.

The NAND-gates 414,415, 416 provide a 0-signal only when all their inputs have a 1-signal applied thereto. In all other combinations of input signals, the NAND-gates provide a 1-signal at their outputs. Conversely, the AND-gates 332, 333, 334 provide a 1-signal only when both inputs have a 1-signal applied. Shift register 331 can be referred to as a ring counter; after the first output pulse of oscillator 330, the first output of the shift register 331 provides a 1-signal; after the second output pulse of oscillator 330, a 1-signal is derived from the second output and after the fourth output pulse, the first output of the shift register 331 again provides a 1-signal.

The operation of the time scanning network 40 can readily be understood when considering the graphs of FIGS. 3 and 4, in which, in FIG. 3, the output signal of the oscillator 330 is shown at row 330*a*. Output signals 331*a*, 331*b*, 331*c* are the output signals from the three outputs of the shift register 331. The interconnection of the AND-gates 332, 333, 334 with the output of oscillator 330 and the outputs of the shift register 331 then provide at the output terminals of the AND-gates 332, 333, 334 the output signals 332*a*, 333*a*, 334*a*. These output signals are temporally shifted with respect to each other in such a manner that temporal overlap of the output signals of two AND-gates is avoided.

The output pulses of the control pulse generator 50 (frequency $c \cdot f_1$) are shown at line 44*a*; the output pulses of the slip frequency pulse source 30 ($c \cdot f_2$) is shown at 45*a*. At time $t_1$, signal 44*a* jumps from 0 to 1. This jump is transferred at the end of the next timing pulse 332*a*, that is, at time $t_2$ at the output $q_1$ of the D flip-flop 410 (see pulse train 411*a*); it is transferred at the end of the next subsequent clock pulse 333*a*, that is, at time $t_3$ to the output $q_1$ of the JK-FF 413 (see pulse train 413*a*). Conversely, the change of input signals 44*a* from 1 to 0 at time $t_5$ (as determined by the setting of the pedal 31, or 32 controlling pulse source 30) is transferred at time $t_6$ to the output of the D-FF 410 and at time $t_7$ to the output of the JK-FF 413.

The third NAND-gate 416 provides an output pulse 416*a* if one of its two inputs has a 0-signal thereon. The output pulse A of the third NAND-gate 416 then arises when the second NAND-gate 415 provides a 0-signal, that is, after change of the input signal 44*a* from 0 to 1, if simultaneously at the output $Q_1$ of the FF 410 a 1-signal is applied (see 411*a*), the output $Q_2$ of the JK-FF 413 still has a 1-signal (see 413*a*) and the output of the second AND-gate 333 has a 1-signal (see 333*a*) applied thereto.

The output pulse B of the third NAND-gate 416 is then derived when, after a change of the input signal 44*a* from 1 to 0, all three inputs of the first NAND-gate 44 have a 1-signal thereon, that is, from the second output of the D-FF 410 (see 411*a*), from the first output of the JK-FF 413 (see 413*a*) and from the second AND-gate 333 (see 333*a*). The conditions to have an output pulse C on the third NAND-gate 416 is similar as with output pulse A.

The time division or time scanning network, in accordance with the present invention, thus is characterized in that, after a change in input signal 44*a* of the first subgroup 40*a*, the output terminal 47 will only have a pulse applied if simultaneously the second AND-gate 333 provides a timing pulse. The timing and clock pulses 333*a* and the output pulse 416 have the same pulse duration. The various groups are interconnected; the first group 40*a* has the clock pulse input T of the D-FF 410 connected to the first AND-gate 332; the clock pulse input T of the JK-FF 413 is connected to the second AND-gate 333. The connections of the clock pulse inputs in the second and third sub-groups 40*b*, 40*c*, respectively, are cyclically interchanged. In the second group 40*b*, the clock pulse input of the D-FF 420 is connected to the second AND-gate 333, and the clock pulse input of the JK-FF 423 is connected to the third AND-gate 334; the third sub-group 40*c* has the clock pulse input T of the D-FF 430 connected to the third AND-gate 334 and the clock pulse input of the JK-FF 433 with the first AND-gate 332.

The output pulses of the first sub-group 40*a* thus coincide with the clock pulses delivered at terminal 333′ from the second AND-gate 333; the output pulses of the second group 40b coincide with those of the third AND-gate 334, and the output pulses of the third group 40*c* coincide with those of the first AND-gate 332.

The situation may occur that output pulses from two pulse sources or pulse generators occur simultaneously; thus, an output pulse may be derived simultaneously from control pulse generator 50 as well as from the slip frequency pulse source 30. This condition is illustrated at time $t_0$ in FIG. 4. These coincident input pulses provide non-coincident output pulses C and F at the outputs 47, 48 of the time division network 40. This ensures that the bi-directional counter 25 accurately counts all pulses of the pulse generators 50, 30, and 19, to provide an exact control of the slip frequency and thus of the dynamo electric machine.

The base frequency of the pulse generator 330 should be selected, preferably, to be at least 10 times higher than the highest output frequency of any one of the pulse generators 50, 30, or 19. This frequency is already divided by three by the shift register 331, and at least three time or clock pulses should be delivered for one pulse of a pulse generator.

The embodiment of FIG. 2*a* provides a different circuit for the sub-groups of the time scanning network 40. This different embodiment is provided to show that the time scanning network can be variously constructed. It is also possible, for example, to utilize the JK-FF 413 with the three NAND-gates in accordance with FIG. 2 connected thereto in advance. The operation, again, will be the same as the circuit of FIG. 2*a*, or that of FIG. 2.

The control amplifier 23 (FIG. 1) is shown in detail in FIG. 5. This particular arrangement has been found to be highly satisfactory and preferred. If, at time $t_1$, the input voltage $U_e$ at the input terminal 237 suddenly jumps, condenser 233 first acts as a short circuit for resistance 232. Only resistance 231, at an initial time, acts as a feedback resistance, so that the output voltage $U_a$ has a small, non-delayed proportional value $U_1$. As the condenser 233 charges, the effective feedback resistance increases and the output voltage of operational amplifier 230 increases continuously until, when the condenser 233 is fully charged, an upper limit $U_2$ has been reached.

The control pulse generator 50 has to meet specific requirements, particularly since its output frequency should change, in dependence on change of input direct current voltage, linearly in a range of 1 : 2,000. In the described embodiment, the output frequency may vary from 15 Hz to 30 kHz. Simultaneously, and within the entire frequency range, the ratio of pulse duration to pulse interval should be uniform and 1 : 1. Ordinary oscillators usually can meet these requirements only if an oscillator is used which has various frequency ranges, the frequency ranges being automatically shiftable.

In accordance with a feature of the invention, the circuit of FIG. 6 and FIG. 7 provides a simple solution for such a control pulse generator.

Referring now to FIGS. 6 and 7, at the illustrated switching position of chopper 52, the output signal of control amplifier 23 is applied over input terminal 56, inverter stage 51, and chopper 52 to the integrator 53. The integrator thus integrates backwardly, until its output voltage reaches the lower switching threshold value of threshold switch 54. At this point, threshold switch 54 provides a jump and the output voltage of the threshold switch 54 jumps in positive direction. Due to the feedback line, the chopper is also switched, and the input signal is now applied without the intervention of the inverter 51 to the integrator 53. Integrator 53 thus will integrate forwardly until its output voltage reaches the upper threshold value of threshold switch 54. At that point, the output voltage of the threshold switch 54 changes to its negative value, chopper 52 is re-set, and the cycle repeats. The amplitude of the output voltage of the integrator 53 is given by the hysteresis, that is, the voltage difference between the upper and the lower threshold value of switch 54. The output of threshold switch 54 thus provides square wave pulses which are applied over an amplifier stage (not shown) to the frequency control input 22 of the control generator 20, and to the input 44 of the time division network 40. The frequency of the output pulses of the threshold switch 54 will depend on the steepest of the triangular pulses, that is, on the steepest of the flanks of the pulses delivered by integrator 53. The steepness slope of the flanks will in turn depend on the input voltage to the input terminal 56. The triangular pulses from integrator 53 are symmetrical when the inverter 51 has an amplification factor of exactly minus one. In this case, the ratio of output pulses of the pulse generator 50 to pulse intervals will be exactly 1 : 1. If the inverter amplifier has a different amplification value, so that the pulses applied to the two terminals of the chopper are not entirely symmetrical, then the pulse duration and interval periods will vary; control of the inverter amplifier thus provides for variation of the output pulse versus pulse interval time.

The operation, in detail, is best understood in connection with FIG. 7. Power supply is derived from a positive bus 58 and negative bus 60, positive bus 58 providing a voltage of, for example, +10 V with respect to ground or chassis. The stages 51, 53 and 54 utilize operational amplifiers as active elements, each one having one input tied to the common zero potential line 59. This zero potential line 59 provides a uniform reference potential of zero volts.

The FET 520 in chopper 52 is either conductive or non-conductive, depending on the output voltage of the threshold switch 54. Resistance 52 is exactly twice as great as resistance 51, in one example resistance 51 being 10 kΩ, resistance 52 being 20 kΩ. The FET has an insulated gate electrode and is of the *n* -channel depletion type. The drain-source path is blocked when the gate electrode has a voltage of –5 V applied thereto. It is conductive when the gate electrode has a voltage of +5 V applied.

When the FET 520 is blocked, the input voltage of the control pulse source is applied over the resistance of 20 kΩ to the input of integrator 53. When the FET is conductive, the input voltage in the inverter stage 51 is applied additionally over the resistance of 10 kΩ to the input of the integrator 53. The input current of the integrator 53 thus reverses in sign when the FET becomes conductive and retains its value.

The input voltage of terminal 56 can have values of between 0 and –5 V applied. The frequency of the control impulse generator 50 is dependent on the value, or amplitude of the input voltage. As an example, let the output of the threshold switch 54 have a voltage of +5 V, so that the FET 520 becomes conductive. The inverted portion of the input voltage to integrator 53 will be controlling, that is, the integrator 53 will have a voltage between 0 and +5 V applied. Since the input to integrator 53 is identical to the inverted input of the operational amplifier 530, integrator 53 will integrate backwardly until the lower threshold value of the threshold switch 54 has been reached, so that its output potential will jump to –5 V. At this instance, the FET 520 will block, and the input of the integrator will then only have the non-inverted voltage from terminal 56 applied.

Integrator 53 now begins to integrate upwardly until its output voltage reaches the upper threshold value of the threshold switch 54. The cycle repeats with a frequency which depends on the slope of the triangular pulses delivered from the integrator 53, which slope, in turn, depends on the input voltage of terminal 56. The amplitude of the triangular pulses of integrator 53 is determined by the switching hysteresis, that is, by the voltage difference between the upper and the lower threshold value of threshold switch 54.

The SCR gate control amplifier 20 can thus be controlled for optimum frequency, that is, for optimum operation with optimum slip of the asynchronous machine 11. The time division network can be built entirely from digital components, in accordance with digital, or integrated circuit techniques which are inexpensive, and are substantially unaffected by noise pulses. Noise pulses can hardly be avoided when the circuit includes thyristor inverter stages, that is, SCR components. The control amplifier 23 provides a small, non-delayed proportional value and a proportional value which increases, but with some delay. Its transfer function thus is not exactly linear. Short-time variations of the output count in the counter 25 are thus effectively suppressed while a good dynamic stability of the frequency control loop is obtained.

The bi-directional counter 25 acts as an integrator in the slip frequency control loop, since its count condition, or count state will remain steady, when both count inputs have an identical number of pulses applied thereto for each unit of time. Its count state will change only when one input has an excess value of pulses applied thereto. Since the control loop includes an integrator, permanent deviations of the slip frequency due to changes in loading on the asynchronous machine 11 will not occur.

The pulse generator 50, as described in connection with FIGS. 6 and 7, can cover the entire frequency spectrum from 15 Hz to 30,000 Hz, as required for the operation of an asynchronous machine, with a constant space-pulse ratio of 1 : 1. The circuit of FIGS. 6 and 7 is not limited to a pulse source for control circuits to control electric machinery; rather, such a circuit can be utilized where an extreme range in output frequency is required. The change in the mark-space ratio (pulse duration and pulse interval ratio) which could be required for other applications can readily be obtained by making the feedback resistance 512 in the inverter stage 51 a potentiometer, or an otherwise controllable resistance. It will cause the output triangular voltage of the integrator 53 to become asymmetrical, and the output pulses of the threshold switch 54 will no longer have a pulse to interval ratio of 1 : 1.

The use of the time scanning network 40 is not limited to the embodiment described. For example, it is possible to utilize a pulse source 33 which has a shift register having 10 outputs, and to provide 10 AND-gates. The time scanning network 40 can then have 10 similarly constructed sub-groups, each connected to avoid coincidence of 10 different pulse trains, derived, for example, from 10 different sources.

Various changes and modifications may be made within the inventive concept.

We claim:

1. Digital slip frequency control circuit to control thyristor-type inverter circuits (13, 14, 15) supplying an asynchronous dynamo electric machine (11) with a-c power from a d-c source (12) comprising a control pulse generator (50) connected to control the gates of the inverter circuits and supplying thereto firing pulses at a first pulse repetition frequency (PRF) ($f_1$);

a slip frequency pulse generator (30) supplying pulses at a PRF ($c \cdot f_2$) representative of a command value;

a tachometer generator (19) supplying pulses at a PRF representative of the speed of the asynchronous machine;

a bi-directional counter (25) having a positive going count input (*v*) and a negative going count input (*r*);

means (24, 23) interconnecting the input of the pulse control generator (50) and the output of the bi-directional counter (25) and controlling the PRF of the pulse control generator (50) in dependence on the count number in the bi-directional counter (25);

a clock pulse source (33) of predetermined frequency (FIG. 3: 330*a*) which is higher than the highest PRF of the control pulse generator (50), the slip frequency pulse generator (30) and the tachometer generator (19);

and a time scanning and division network (40) controlled by said clock pulse source (33) interconnecting the outputs of said control pulse generator (50), the slip frequency pulse generator (30) and the tachometer generator (19) and the inputs of the bi-directional counter (25), said time division network directing application of pulses from any of said generators to an input of the bi-directional counter only at instants of time determined by occurrence of the clock pulses (330*a*) of the clock pulse source (33) to prevent overlap of pulses from different pulse generators applied to different inputs of the counter.

2. Circuit according to claim 1, wherein the time scanning and division network (40) comprises first, second and third circuit groups (40*a*, 40*b*, 40*c*), each controlled by said clock pulse source (33);

the first of the circuit groups (40*a*) being connected between the output of the control pulse generator (50) and a reverse current input (*r*) of the bi-directional counter (25);

the third circuit group (40*c*) being connected between the output of the tachometer generator (19) and the forward count input (*v*) of the bi-directional counter (25);

and the second circuit group (40*b*) being connected between the slip frequency pulse generator (30) and, selectively, to either the forward (V) or reverse (R) count input of the bi-directional counter (25).

3. Circuit according to claim 2, including switch means (28) interconnecting the second circuit group (40*b*) selectively, depending on switch positions, with the forward (*v*) or the reverse (*r*) count input of the bi-directional counter (25);

and means (31, 32) selectively operable to command motor, or generator operation of the asynchronous dynamo electric machine (11) and controlling the position of the switch means.

4. Circuit according to claim 2, including an OR-gate (26) interconnecting the outputs of the first, and, selectively, the second circuit group to the reverse (r) count input of the bi-directional counter (25);

and an OR-gate (27) interconnecting the outputs of the third (40*c*) and, selectively, the second circuit groups (40*b*) to the forward (*v*) count input of the bi-directional counter (25).

5. Circuit according to claim 2, wherein each of the circuit groups comprises a first coincidence flip-flop (410, 420, 430) having a switch-over input and a clock pulse input (T) connected to said clock pulse source (33);

a second coincidence flip-flop (413, 423, 433) connected to the output of said first flip-flop and having a clock pulse input (T-333') connected to said clock pulse source (33) to be controlled by said first flip-flop and said clock pulse source, at least one of said flip-flops having bi-directional outputs ($Q_1, Q_2$);

and a group of NAND-gates (414, 415, 416; 424, 425, 426; 434, 435, 436) connected to the bi-directional outputs and said clock pulse source to provide an output from the respective circuit groups only upon coincidence of an input pulse from the respective generator and a selected pulse from the clock pulse source.

6. Circuit according to claim 5, wherein the first flip-flop has complementary outputs ($Q_1, Q_2$);

and the second flip-flop has complementary inputs interconnected with respective outputs of the first flip-flops.

7. Circuit according to claim 6, wherein both the first and second flip-flops have complementary outputs;

three NAND-gates are provided;

the first NAND-gate (414) having an input connected to the 0-output of the first flip-flop (410), another input to the 1-output of the second flip-flop (413) and another to the clock pulse input (332') of the first flip-flop;

the second NAND-gate (415) having an input connected to the 1-output of the first flip-flop (410), another input to the 0-output of the second flip-flop (413) and another to the clock pulse input (333') of the second flip-flop;

and the third NAND-gate (416) having two inputs connected to the outputs of the first and second NAND-gates (414, 415), the output from the third NAND-gate forming the output from the circuit group.

8. Circuit according to claim 1, wherein the clock pulse generator (33) comprises a pulse source (330) and three AND-gates (332, 333, 334) connected thereto in a logic circuit to provide three trains of clock pulses (**332*a*, 333*a*, 334*a***) each of the same frequency and equally phase-shifted with respect to each other, the pulses of two sequential pulse trains being separated from each other so as to eliminate any overlap.

9. Circuit according to claim 5, wherein the clock pulse generator (33) comprises a pulse source (330) and three AND-gates (332, 333, 334) connected in a logic circuit to provide three trains of clock pulses of the same frequency and equally phase shifted with respect to each other;

wherein the first circuit group has a first clock pulse train (**332*a*) connected to the first flip-flop (410) and a second pulse train (333*a*) to the second flip-flop (413**);

the second circuit group has the second clock pulse train (**333*a*) connected to the first flip-flop (420) and the third clock pulse train (334*a*) to the second flip-flop (423**);

and the third circuit group has the third clock pulse train (**334*a*) connected to the first flip-flop (430) and the first clock pulse train (332*a*) to the second flip-flop (433**).

10. Circuit according to claim 5, wherein the flip-flops are similar, each having 0 and 1-inputs, a coincidence clock pulse input (T) and 0 and 1 outputs.

11. Circuit according to claim 1, wherein the interconnection means (24, 23) includes a control amplifier (23) comprising an operational amplifier (230);

a pair of series connected resistances (231, 232) in the feedback circuit of the operational amplifier;

and a condenser (233) connected in parallel to one (232) of the series connected resistors.

12. Circuit according to claim 1, wherein the control pulse generator (50) comprises a series circuit including an input terminal (56) and an inverter (51) in parallel thereto;

a chopper (52) connected both to the inverter and to the input terminal;

an integrator circuit (53) connected to the output of the chopper;

and a threshold circuit switch (54) connected to the output of the integrator circuit.

13. Circuit according to claim 12, wherein the chopper (52) comprises a field effect transistor (FET) (520);

a first resistance (522) connecting one base terminal of the FET (520) to the input;

the inverter, and a second resistance (521) connecting the other base terminal of the FET to the input;

the first resistance (522) being twice the value of the second resistance;

and a gate electrode (G) of the FET (520) forming the chopper control input.

14. Circuit according to claim 13, wherein the gate terminal forming the chopper control input is derived from the output of the threshold circuit switch (54).

* * * * *